(12) United States Patent
Krishnan et al.

(10) Patent No.: US 10,956,475 B2
(45) Date of Patent: Mar. 23, 2021

(54) VISUAL PRESENTATION OF SEARCH RESULTS

(71) Applicant: ImageScan, Inc., Pasadena, CA (US)

(72) Inventors: Basker S. Krishnan, San Marino, CA (US); Hanoz J. Kateli, Monrovia, CA (US); Bryan Heesch, Pasadena, CA (US)

(73) Assignee: ImageScan, Inc., Pasadena, CA (US)

( * ) Notice: Subject to any disclaimer, the term of this patent is extended or adjusted under 35 U.S.C. 154(b) by 0 days.

(21) Appl. No.: 14/880,269

(22) Filed: Oct. 11, 2015

(65) Prior Publication Data

US 2016/0147848 A1  May 26, 2016

Related U.S. Application Data

(63) Continuation-in-part of application No. 12/836,293, filed on Jul. 14, 2010, now abandoned.

(60) Provisional application No. 61/321,132, filed on Apr. 6, 2010.

(51) Int. Cl.
*G06F 16/30* (2019.01)
*G06F 16/34* (2019.01)

(52) U.S. Cl.
CPC .................. *G06F 16/34* (2019.01)

(58) Field of Classification Search
CPC ..... G06F 17/3061; G06F 16/335; G06F 16/34
See application file for complete search history.

(56) References Cited

U.S. PATENT DOCUMENTS

| | | | |
|---|---|---|---|
| 5,771,378 A | 6/1998 | Holt et al. | |
| 5,995,976 A | 11/1999 | Walker et al. | |
| 5,995,978 A | 11/1999 | Cullen et al. | |
| 6,184,885 B1 | 2/2001 | DeStefano | |
| 6,297,824 B1 * | 10/2001 | Hearst | G06F 16/338 715/848 |
| 6,741,985 B2 | 5/2004 | Green | |
| 6,834,276 B1 * | 12/2004 | Jensen | G06F 17/30882 |
| 7,373,612 B2 | 5/2008 | Risch et al. | |
| 7,596,574 B2 | 9/2009 | Sweeney | |
| 7,644,373 B2 | 1/2010 | Jing et al. | |
| 7,689,933 B1 | 3/2010 | Parsons | |
| 7,747,428 B1 | 6/2010 | Karsh et al. | |

(Continued)

OTHER PUBLICATIONS

Word 2010 Features and Benefits.

(Continued)

*Primary Examiner* — Mohammad S Rostami
(74) *Attorney, Agent, or Firm* — Alonzo & Associates; Arlyn Alonzo (57) ABSTRACT

The present disclosure involves displaying a search result by selecting a repository for searching; inputting one or more keywords for searching, wherein at least one of the one or more keywords is a location mandatory keyword; searching the selected repository for one or more documents that contain the one or more inputted keyword to generate a search result; defining at least two elements of a tree structure view; selecting a portion of the tree structure view to display and displaying the search result in the selected portion of the tree structure view. Also, one of the at least two elements maybe a subset of another of the at least two elements. In some examples, a display includes at least four bucket categories based which are displayed for one of the at least two elements.

25 Claims, 8 Drawing Sheets

(56) References Cited

U.S. PATENT DOCUMENTS

| | | | |
|---|---|---|---|
| 7,870,130 B2 | 1/2011 | Banerjee et al. | |
| 8,005,825 B1 | 8/2011 | Ghosh | |
| 8,259,124 B2 | 9/2012 | Averett | |
| 8,433,705 B1 | 4/2013 | Dredze et al. | |
| 8,688,668 B1* | 4/2014 | Sawyer | G06F 16/338 707/705 |
| 8,935,290 B2 | 1/2015 | Ippili et al. | |
| 9,092,428 B1 | 7/2015 | Zhang | |
| 9,142,253 B2 | 9/2015 | Ubillos | |
| 9,483,532 B1 | 11/2016 | Zhang | |
| 9,772,999 B2 | 9/2017 | Krishnan et al. | |
| 10,459,984 B2 | 10/2019 | Krishnan et al. | |
| 10,467,273 B2 | 11/2019 | Krishnan et al. | |
| 2003/0167279 A1 | 9/2003 | Smiga et al. | |
| 2003/0195980 A1 | 10/2003 | Geshwind | |
| 2004/0001104 A1 | 1/2004 | Sommerer et al. | |
| 2004/0054967 A1 | 3/2004 | Brandenberger | |
| 2004/0093331 A1 | 5/2004 | Garner et al. | |
| 2004/0095376 A1 | 5/2004 | Graham et al. | |
| 2004/0111409 A1 | 6/2004 | Abe | |
| 2005/0108001 A1 | 5/2005 | Aarskog | |
| 2005/0138056 A1 | 6/2005 | Stefik | |
| 2005/0149576 A1 | 7/2005 | Marmaros et al. | |
| 2005/0182790 A1 | 8/2005 | Gilbert et al. | |
| 2006/0047651 A1 | 3/2006 | Milic-Frayling et al. | |
| 2006/0080292 A1 | 4/2006 | Alanzi | |
| 2006/0133699 A1 | 6/2006 | Widrow et al. | |
| 2006/0174198 A1 | 8/2006 | Brown et al. | |
| 2006/0277167 A1 | 12/2006 | Gross | |
| 2007/0011149 A1 | 1/2007 | Walker | |
| 2007/0061717 A1 | 3/2007 | Cragun | |
| 2007/0083552 A1 | 4/2007 | Allen et al. | |
| 2007/0106659 A1* | 5/2007 | Lu | G06F 17/30554 |
| 2007/0179945 A1 | 8/2007 | Marston et al. | |
| 2007/0203945 A1 | 8/2007 | Louw | |
| 2007/0233692 A1 | 10/2007 | Lisa et al. | |
| 2008/0005101 A1 | 1/2008 | Chandra | |
| 2008/0010251 A1* | 1/2008 | Fontoura | G06F 16/3325 |
| 2008/0065636 A1 | 3/2008 | Miller et al. | |
| 2008/0097984 A1 | 4/2008 | Candelore | |
| 2008/0098300 A1* | 4/2008 | Corrales | G06F 17/30896 715/243 |
| 2008/0098432 A1 | 4/2008 | Hardacker et al. | |
| 2008/0148147 A1 | 6/2008 | Poston et al. | |
| 2008/0204788 A1 | 8/2008 | Kelly et al. | |
| 2008/0263022 A1 | 10/2008 | Kostorizos et al. | |
| 2008/0281860 A1* | 11/2008 | Elias | G06F 17/30716 |
| 2009/0043824 A1* | 2/2009 | Claghorn | G06F 17/30011 |
| 2009/0094238 A1 | 4/2009 | Banerjee et al. | |
| 2009/0158181 A1* | 6/2009 | Becerra, Sr. | G06F 3/0485 715/764 |
| 2009/0183115 A1 | 7/2009 | Iwasaki | |
| 2009/0216736 A1 | 8/2009 | Dexter et al. | |
| 2009/0228777 A1* | 9/2009 | Henry | G06F 17/30017 715/230 |
| 2009/0287669 A1 | 11/2009 | Bennett | |
| 2009/0313352 A1 | 12/2009 | Dupont | |
| 2010/0246884 A1 | 9/2010 | Chen et al. | |
| 2010/0299201 A1 | 11/2010 | Thrasher | |
| 2010/0332515 A1* | 12/2010 | Carraher | G06F 17/30864 707/769 |
| 2011/0004588 A1* | 1/2011 | Leitersdorf | G06F 17/30864 707/711 |
| 2011/0035383 A1 | 2/2011 | Ghimire | |
| 2011/0035660 A1 | 2/2011 | Lussier et al. | |
| 2011/0099163 A1* | 4/2011 | Harris | G06F 17/30997 707/723 |
| 2011/0119262 A1 | 5/2011 | Dexter et al. | |
| 2011/0246453 A1 | 6/2011 | Krishnan et al. | |
| 2011/0202334 A1* | 8/2011 | Abir | G06F 17/2809 704/4 |
| 2011/0208703 A1* | 8/2011 | Fisher | G06F 16/88 707/692 |
| 2011/0218990 A1 | 9/2011 | Jordahl | |
| 2011/0238697 A1* | 9/2011 | Aslam | G06F 7/00 707/770 |
| 2011/0244882 A1* | 10/2011 | Hancock | H04W 4/02 455/456.1 |
| 2011/0258049 A1 | 10/2011 | Ramer et al. | |
| 2011/0295879 A1 | 12/2011 | Logis et al. | |
| 2012/0066210 A1 | 3/2012 | Mukerjee et al. | |
| 2012/0078979 A1 | 3/2012 | Ghimire | |
| 2012/0150861 A1 | 6/2012 | Thione | |
| 2012/0204104 A1 | 8/2012 | Walsh | |
| 2012/0226500 A1 | 9/2012 | Balasubramanian et al. | |
| 2013/0041921 A1 | 2/2013 | Cooper et al. | |
| 2013/0103707 A1 | 4/2013 | Krishnan et al. | |
| 2013/0124515 A1 | 5/2013 | Ghimire | |

OTHER PUBLICATIONS

Adobe Acrobat 9 Standard Advanced Search Options.

Adobe Acrobat 9 Standard Find Text in a PDF.

Adobe Acrobat 9 Standard Find Text in multiple PDFs.

Adobe Acrobat 9 Standard Search Features Overview.

Thomas Macentee: "Google Books for Genealogy", Sep. 3, 2011, pp. 1-7, XP055188474, retrieved from Internet: URL:http://web.archive.org/web/20110903063944/http://www.archives.com/experts/macentee-thomas/google-books-for-genealogy.html [retrieved May 11, 2015].

Anonymous: "efTwo (F2) Finds Multiple Words & Their Inflections on a page [Chrome]", Aug. 10, 2011, pp. 1-6, XP055407982, retrieved from the Internet: URL:http://web.archive.org/web/20110810224803/https://www.additivetips.com/internet-tips/eftwo-f2-finds-multiple-words-their-inflections-on-a-page-chrome/ [retrieved on Sep. 19, 2017].

CN101770514A, Published Jul. 7, 2010.

CN101216837A, Published Jan. 18, 2008.

Antiqueira et al. "Complex Network Approach to Text Summarization", Published Feb. 15, 2009.

Youguo et al. "The Frame of Cognitive Pattern Recognition", Published Jul. 26, 2007.

*Electric Power Group v. Alstrom* (District Court, California Central District, No. 2:12-cv-06365-JGB (Aug. 1, 2016)).

*Intellectual Ventures v. Capital One Financial Corp* (District Court, Dist of Maryland, No. 8:14-cv-00111-PWG (Mar. 7, 2017)).

Pratt et al., "A Knowledge-Based Approach to Organizing Retrieved Documents" (1999).

Baeza-Yates et al. "Modern Information Retrieval" 1999, ACM Press.

* cited by examiner

VISUAL PRESENTATION OF SEARCH RESULTS

CLAIM OF PRIORITY UNDER 35 U.S.C. 119 AND 120

The present Application for Patent is a continuation in part of and claims priority to U.S. patent application Ser. No. 12/836,293 entitled "Apparatus and Method for Visual Presentation of Search Results to Assist Cognitive Pattern", filed on Jul. 14, 2010 which claims priority to Provisional Application No. 61/321,132 entitled Apparatus and Method for Cognitive Pattern Recognition filed Apr. 6, 2010, and assigned to the assignee hereof and hereby expressly incorporated by reference herein.

FIELD

This disclosure relates generally to apparatus and methods for searching and visual presentation. More particularly, the disclosure relates to visual presentation of search results to assist cognitive pattern recognition.

BACKGROUND

In current document files, it is known that many documents with similar or even identical words exist. Thus, with the commonality of words and phrases in different documents or even different versions of the documents, it is time consuming to find an exact document quickly and efficiently. Often, a keyword search could produce a list of many documents with the same word and even include all the various versions of the different documents containing the keyword. This is especially problematic if the keyword used in the search is a common word for a particular application.

SUMMARY

Disclosed are apparatuses and methods for visual presentation. According to one aspect, a method for displaying a search result, including selecting a repository for searching; inputting one or more keywords for searching, wherein at least one of the one or more keywords is a location mandatory keyword; searching the selected repository for one or more documents that contain the one or more inputted keyword to generate a search result; defining at least two elements of a tree structure view; selecting a portion of the tree structure view to display and displaying the search result in the selected portion of the tree structure view.

According to another aspect, a method for displaying a search result, including selecting a repository for searching; inputting one or more keywords for searching; searching the selected repository for one or more documents that contain the one or more inputted keyword to generate a search result; defining at least two elements of a tree structure view, wherein one of the at least two elements is a subset of another of the at least two elements; selecting a portion of the tree structure view to display and displaying the search result in the selected portion of the tree structure view.

According to another aspect, a method for displaying a search result, including selecting a repository for searching; inputting one or more keywords for searching; searching the selected repository for one or more documents that contain the one or more inputted keyword to generate a search result; defining at least two elements of a tree structure view; selecting a portion of the tree structure view to display and displaying the search result in the selected portion of the tree structure view with at least four bucket categories based on the search result, wherein the at least four bucket categories is displayed for one of the at least two elements.

According to another aspect, a method for searching using cognitive pattern recognition comprising searching at least one document associated with a search text; presenting a quantity of the at least one document in a scaled common image format (CIF); selecting a document in the quantity for display; adding a visual distinction to all pages of the selected document where the search text exists from the rest of the pages of the selected document; and displaying all pages of the selected document wherein the search text exists in the scaled common image format (CIF).

According to another aspect, an apparatus for creating an association between a word and an object, the apparatus comprising a processor and a memory, the memory containing program code executable by the processor for performing the following: searching at least one document associated with a search text; presenting a quantity of the at least one document in a scaled common image format (CIF); selecting a document in the quantity for display; adding a visual distinction to all pages of the selected document where the search text exists from the rest of the pages of the selected document; and displaying all pages of the selected document wherein the search text exists in the scaled common image format (CIF).

According to another aspect, an apparatus for searching using cognitive pattern recognition comprising means for searching at least one document associated with a search text; means for presenting a quantity of the at least one document in a scaled common image format (CIF); means for selecting a document in the quantity for display; means for adding a visual distinction to all pages of the selected document where the search text exists from the rest of the pages of the selected document; and means for displaying all pages of the selected document wherein the search text exists in the scaled common image format (CIF).

According to another aspect, a computer-readable medium storing a computer program, wherein execution of the computer program is for searching at least one document associated with a search text; presenting a quantity of the at least one document in a scaled common image format (CIF); selecting a document in the quantity for display; adding a visual distinction to all pages of the selected document where the search text exists from the rest of the pages of the selected document; and displaying all pages of the selected document wherein the search text exists in the scaled common image format (CIF).

Advantages of the present disclosure may include reducing the steps and time needed to search for an object (e.g., a document) or information within the object. Another possible advantage includes increased accuracy and built in fault tolerance in locating an object or information within the object.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

A search may be based on not just words contained in a document, but also the user's memory of a visual image of the document and/or the approximate date of the document. For example, different documents or versions of a same document may contain many identical keywords. However, the visual presentation of the first page of different document types may differ. Thus, there's a need for a search approach that can utilize the aspects of keyword searching and visual presentation of the document and/or the approximate date of the document being searched to quickly and efficiently locate the document in a document repository (e.g., database.). One skilled in the art would understand that a document repository may include an electronic repository or an electronic database.

Figure 1:
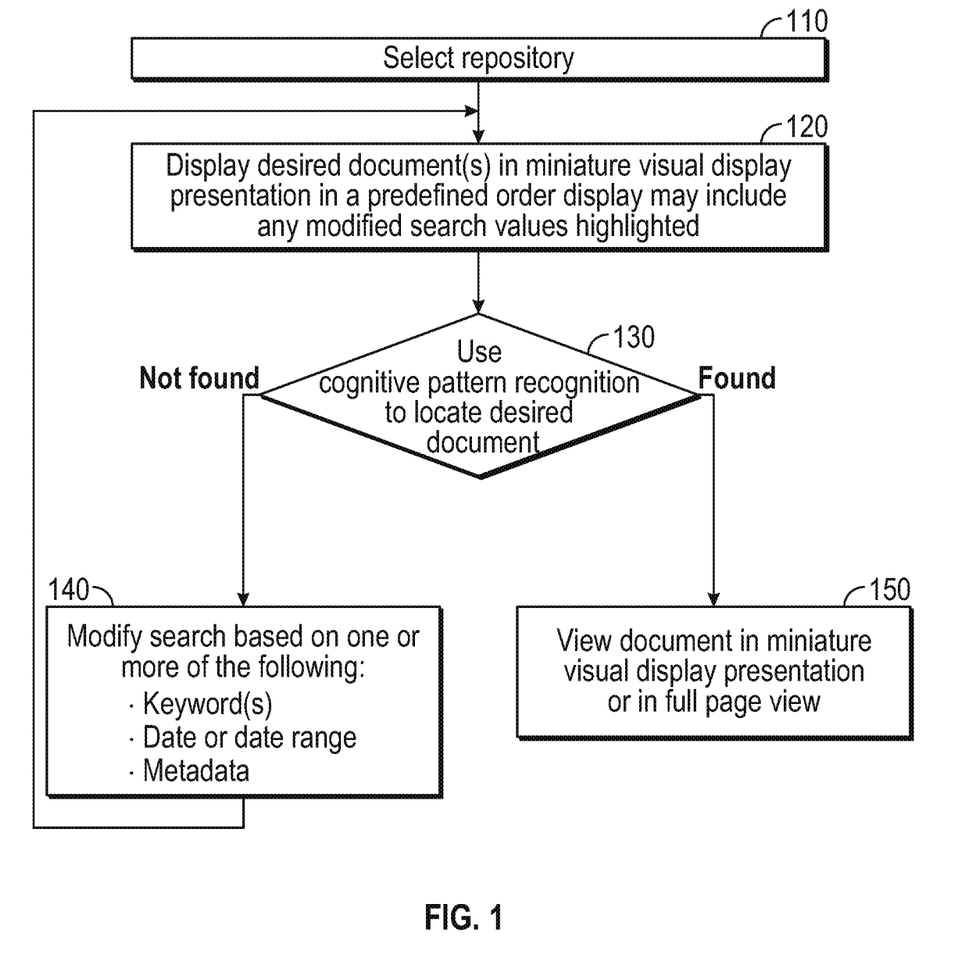
FIG. 1 illustrates an example of a first flow diagram for visual presentation of search results to assist cognitive pattern recognition.

FIG. 1 illustrates an example of a first flow diagram for visual presentation of search results to assist cognitive pattern recognition. In block 110, select a repository. In one example, the repository is the Internet. In another example, the repository is a private database. In block 120, display desired documents in miniature visual display presentation in a predefined order. In one example, the display may include any modified search values highlighted. In block 130, use cognitive pattern recognition to locate desire document. If the desired document is not found, or there are numerous documents to review, proceed to block 140. In block 140, modify the search based on one or more of the following: keyword(s), date or date range, meta data, etc. If the desired document is found, proceed to block 150. In block 150, view the found document in miniature visual display presentation or in full page view.

Figure 2:
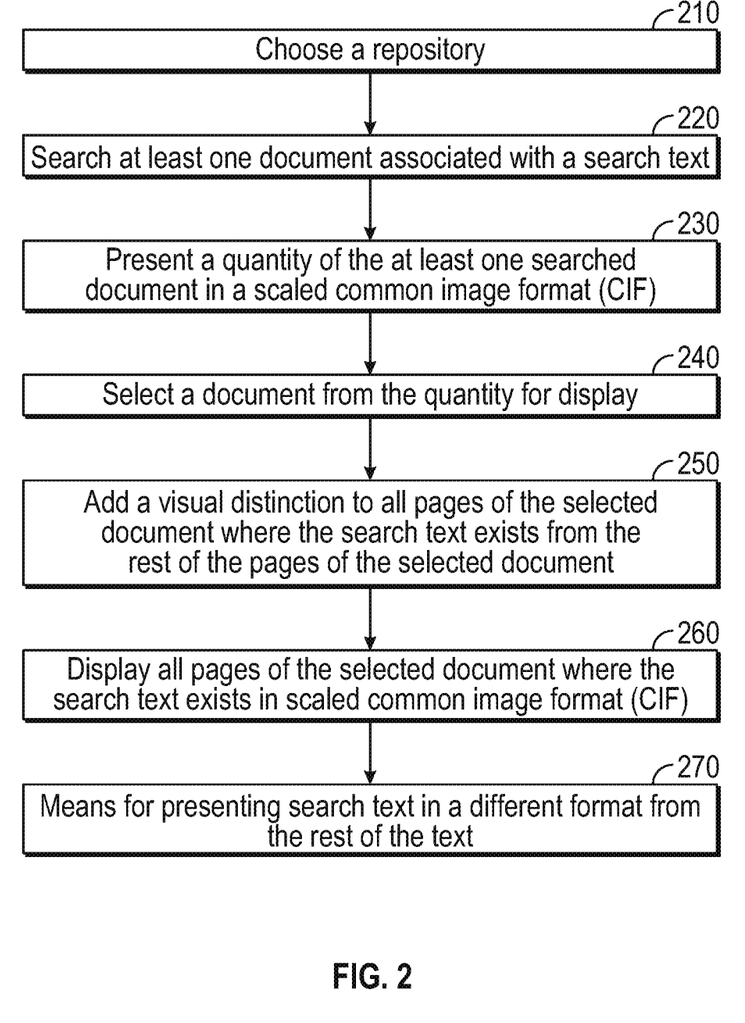
FIG. 2 illustrates an example of a second flow diagram for visual presentation of search results to assist cognitive pattern recognition.

FIG. 2 illustrates an example of a second flow diagram for visual presentation of search results to assist cognitive pattern recognition. In block 210, choose a repository. In block 220, search for a document associated with a search text in the repository. In example, the search text is a single word. In another example, the search text comprises of multiple words. In yet another example, the search text is a phrase of contiguous words. In block 230, present a quantity of the searched documents in a scaled common image format (CIF). In one example, the quantity is predefined. In one aspect, common image format is a digital representation of a document which retains the look and feel of the document in a printed form or it is a visual representation of the pages within digitally converted paper or electronically created documents. In one example, the first page of each of the quantity of the searched documents is presented in the scaled common image format (CIF). In one example, a first page of each of the quantity of the searched documents is presented in the scaled common image format (CIF). In one example, the presenting of the quantity is done in a predetermined order. And, in one example, the predetermined order is based on a meta data parameter. In one aspect, at least one metadata parameter is presented along with the scaled common image format (CIF). In another aspect, a portion of a meta-data parameter is presented along with the scaled common image format (CIF). In one example, the meta-data parameter is modified before being presented. In one aspect, the at least one meta-data parameter is a date information. The date information could, for example, be a date the document is created, a date contained within the document, a date the document is processed, such as scanned, or a date assigned to the document, etc.

In block 240, select one document in the quantity for display. One skilled in the art would understand that although block 240 defines selecting one document, that selecting multiple documents in the quantity for display is not prohibited and is also within the scope and spirit of the present disclosure. In block 250, add a visual distinction to all the pages of the selected document where the search text exists. The visual distinction allows a user to quickly distinguish the pages where the search text exists from the rest of the pages of the selected document where the search text does not exist. In block 260, display all the pages of the selected document where the search text exists in the scaled common image format. In one example, the display of all the pages is on at least one digital screen. One skilled in the art would understand that although the step in block 250 is written to precede the step in block 260, the order of the two steps may be interchanged without affecting the scope or spirit of the present disclosure. In block 270, present the search text in a different format from the rest of the text. In one example, the different format is one of the following: bolding, highlighting, italicizing, underlining, etc. In one example, the rest of the text is confined to the text on the same page that is not the search text. In another example, the rest of the text is confined to the text in the selected document that is not the search text. In one aspect, all occurrences of the search text is shown in the different format at the same time (e.g., simultaneously) on all the pages of the selected document where the search text exists. In one aspect, some of the steps in FIG. 2 are performed by a computer, such as a personal computer. In another aspect, some of the steps in FIG. 2 are performed by a handheld device that incorporates at least one processor.

In one example, although the step in block 270 is shown as the last step of the flow presented in FIG. 2, one skilled in the art would understand that the step of block 270 may take place elsewhere in the flow without affecting the scope or spirit of the present disclosure.

Figure 3A:
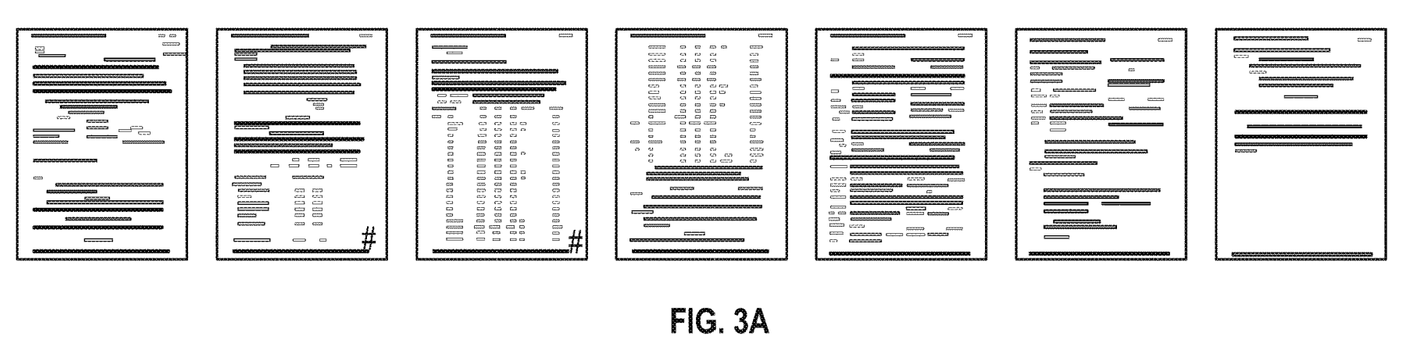
FIG. 3a illustrates an example of a first visual distinction on pages of a selected document where the search text exists.
Figure 3B:
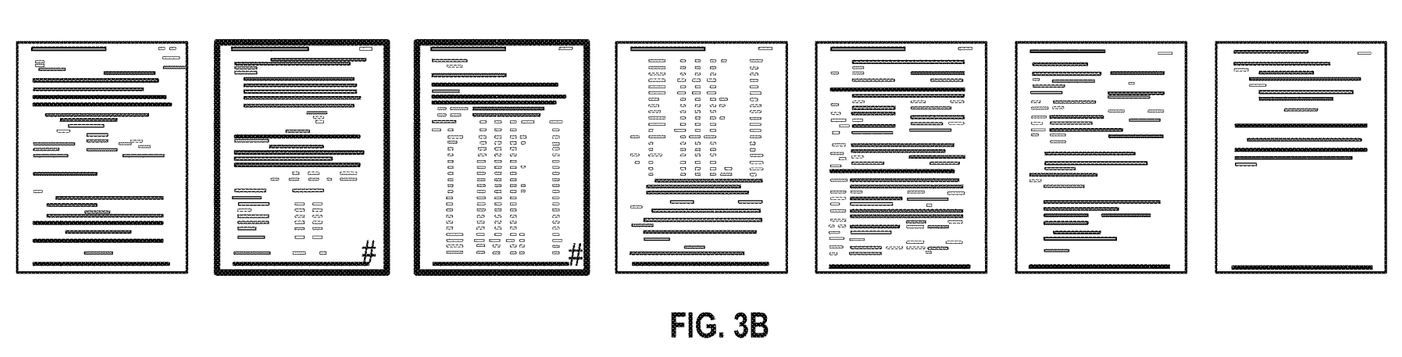
FIG. 3b illustrates an example of a second visual distinction on pages of a selected document where the search text exists.

FIG. 3*a* illustrates an example of a first visual distinction on pages of the selected document where the search text exists. In this example, the first visual distinction is the added page number on each page of the selected document where the search text exists. Although the location of the added page number is shown on the right bottom corner of the page, the location may be anywhere on the page. FIG. 3*b* illustrates an example of a second visual distinction on pages of a selected document where the search text exists. In this example, the second visual distinction is the added border on each page of the selected document where the search text exists. Although the first distinction of the added page number is also shown in FIG. 3*b*, it is an option that may or may not be included in the example of FIG. 3*b*.

Figure 4A:
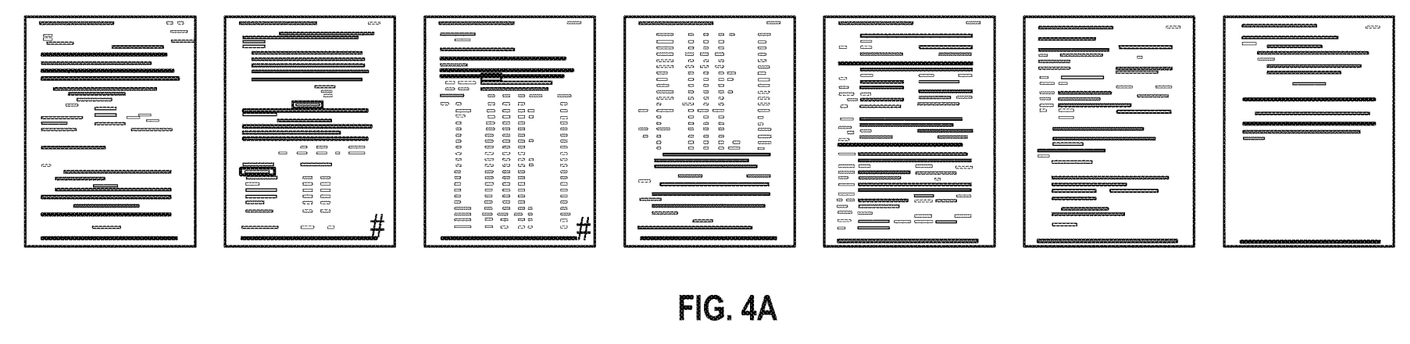
FIG. 4a illustrates the example of the first visual distinction on pages of the selected document where the search text exists as shown in FIG. 3a and the search text is presented in a different format than the rest of the text.
Figure 4B:
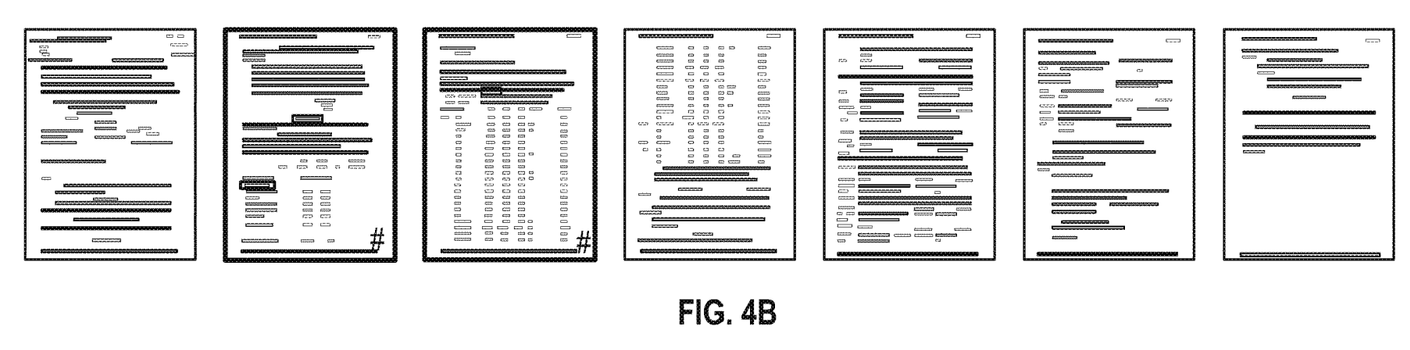
FIG. 4b illustrates the example of the second visual distinction on pages of the selected document where the search text exists as shown in FIG. 4b and the search text is presented in a different format than the rest of the text.

FIG. 4*a* illustrates the example of the first visual distinction on pages of the selected document where the search text exists (as shown in FIG. 3*a*); however, in FIG. 4*a*, the search text is presented in a different format than the rest of the text. FIG. 4*b* illustrates the example of the second visual distinction on pages of the selected document where the search text exists (as shown in FIG. 3*b*); however, the search text is presented in a different format than the rest of the text. In the examples in FIGS. 4*a* and 4*b*, all occurrences of the search text is highlighted. However other forms of different formats, such as but not limited to, bolding, italicizing, underlining, etc. may be used without restricting the scope and spirit of the present disclosure. In the examples of FIG. 4*a* and FIG. 4*b*, the first distinction of the added page number are also shown, but showing the added page number is an option that may or may not be included.

In one example, printed documents are filed or stored. In another example the printed paper document is migrated into a digital file format. For example, a document may be a single page document or a "staple group" which may be a multi page document or a related group of documents grouped together (e.g., stapled or clipped together) and filed into a file folder, binder, cabinet etc. In one aspect, the "staple group" is a group of pages, documents or files electronic linked together. A document may be digitally created and/or modified and stored electronically. A document may comprise, for example, a primary document and any electronic file attachments (e.g. file attachments within an email) including nested embedded documents (Excel spreadsheet inside a Power Point presentation). Each modified and stored instance of a digital file may be considered a unique document (e.g. different versions of a document, email threads etc).

In one aspect, cognitive pattern recognition is based on prior cognitive knowledge. For example, recognition is based on a collective memory about the document being searched. The cognition pattern being recognized may be based on memory of one or more of the following: file format (e.g., Word, Excel etc.), approximate date of the document (last month, last quarter, last year etc.), from and to details on correspondence/email/fax, keywords within documents, key sections within documents (e.g., pricing details within a proposal or termination clause within a contract); memory of how various digital file formats look.

In another example, recognition is based on cognitive intelligence. For example, the search is for a document that one is not familiar with, however aspects of the document are known to the searcher. In one example, the search is for a tax form, a court document or a lab report, etc, wherein each has its unique image pattern that is easily recognizable. In another example, the location of the search text (e.g., highlighted keyword(s)) within a page in common image format allows cognitive pattern recognition. Based on common image format (e.g., miniature visual display) of documents containing highlighted keyword(s), one can quickly recognize and comprehend the relevance of various documents like Correspondence, Presentations, Proposals, Cost Estimates for Cleanup etc. as events on a time line or as a relevant document pertaining to an issue.

One skilled in the art would understand that the steps disclosed in the example flow diagrams in FIGS. 1 and 2 can be interchanged in their order without departing from the scope and spirit of the present disclosure. Also, one skilled in the art would understand that the steps illustrated in the flow diagrams are not exclusive and other steps may be included or one or more of the steps in the example flow diagrams may be deleted without affecting the scope and spirit of the present disclosure.

Those of skill would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise memory stick, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
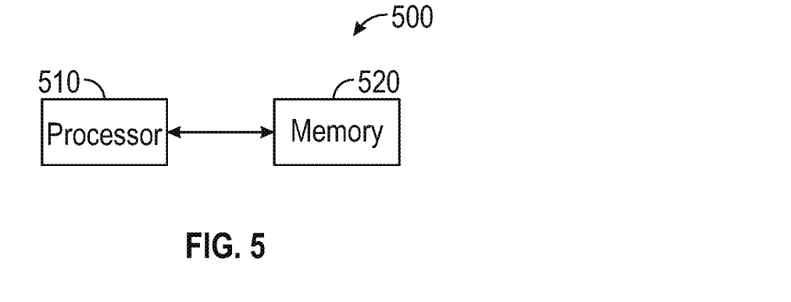
FIG. 5 illustrates an example of a device comprising a processor in communication with a memory for executing the algorithms in the flow diagrams described in FIGS. 1 and/or 2.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 5 illustrates an example of a device 500 comprising a processor 510 in communication with a memory 520 for executing the algorithms in the flow diagrams described in FIGS. 1 and/or 2. In one example, the device 500 is used to implement the algorithm illustrated in FIG. 1. In another example, the device 500 is used to implement the algorithm illustrated in FIG. 2. In one aspect, the memory 520 is located within the processor 510. In another aspect, the memory 520 is external to the processor 510. In one aspect, the processor includes circuitry for implementing or performing the various flow diagrams, logical blocks and/or modules described herein.

Figure 6:
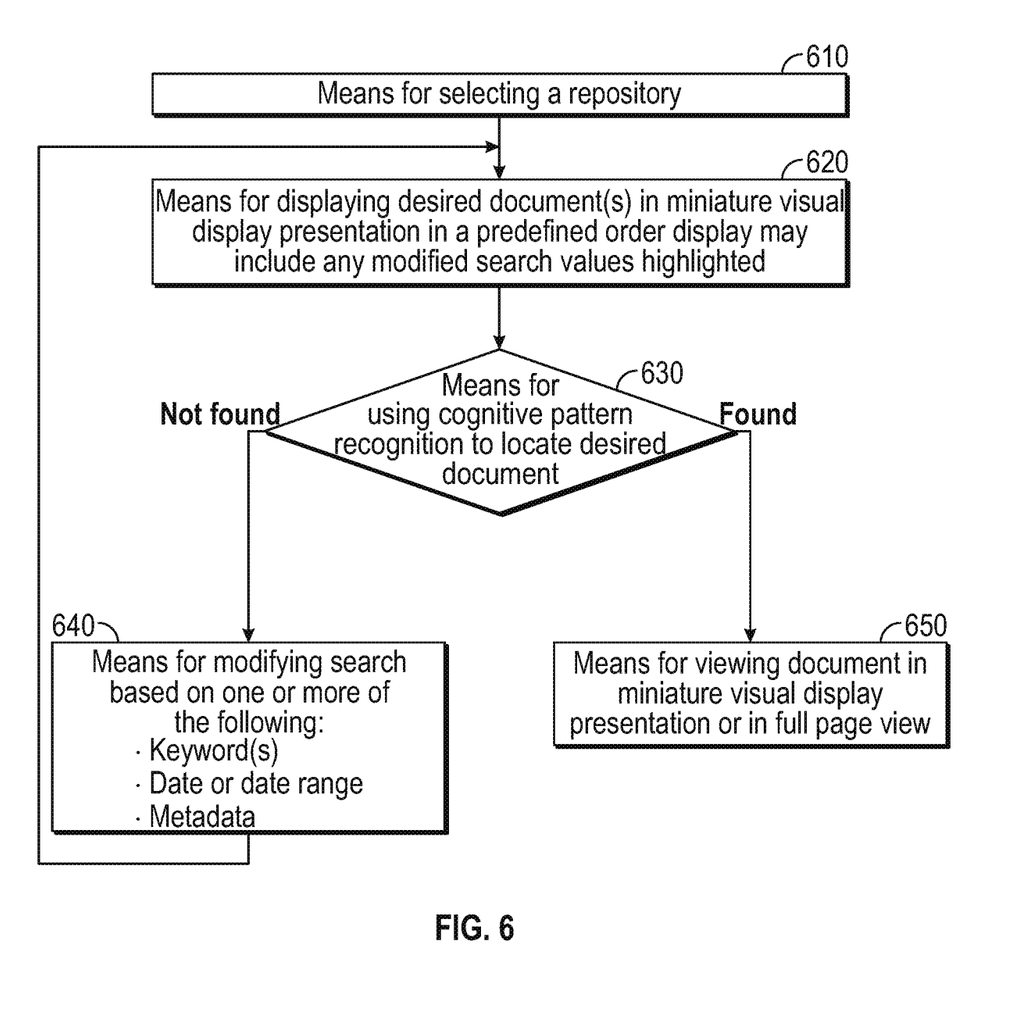
FIG. 6 illustrates an example of a first device suitable for visual presentation of search results to assist cognitive pattern recognition in the flow diagram illustrated in FIG. 1.

FIG. 6 illustrates an example of a device 600 (first device) suitable for visual presentation of search results to assist cognitive pattern recognition in the flow diagram illustrated in FIG. 1. In one aspect, the device 600 is implemented by at least one processor comprising one or more modules configured to search using cognitive pattern recognition as described herein in blocks 610, 620, 630, 640 and 650. For example, each module comprises hardware, firmware, software, or any combination thereof. In one aspect, the device 600 is also implemented by at least one memory in communication with the at least one processor.

Figure 7:
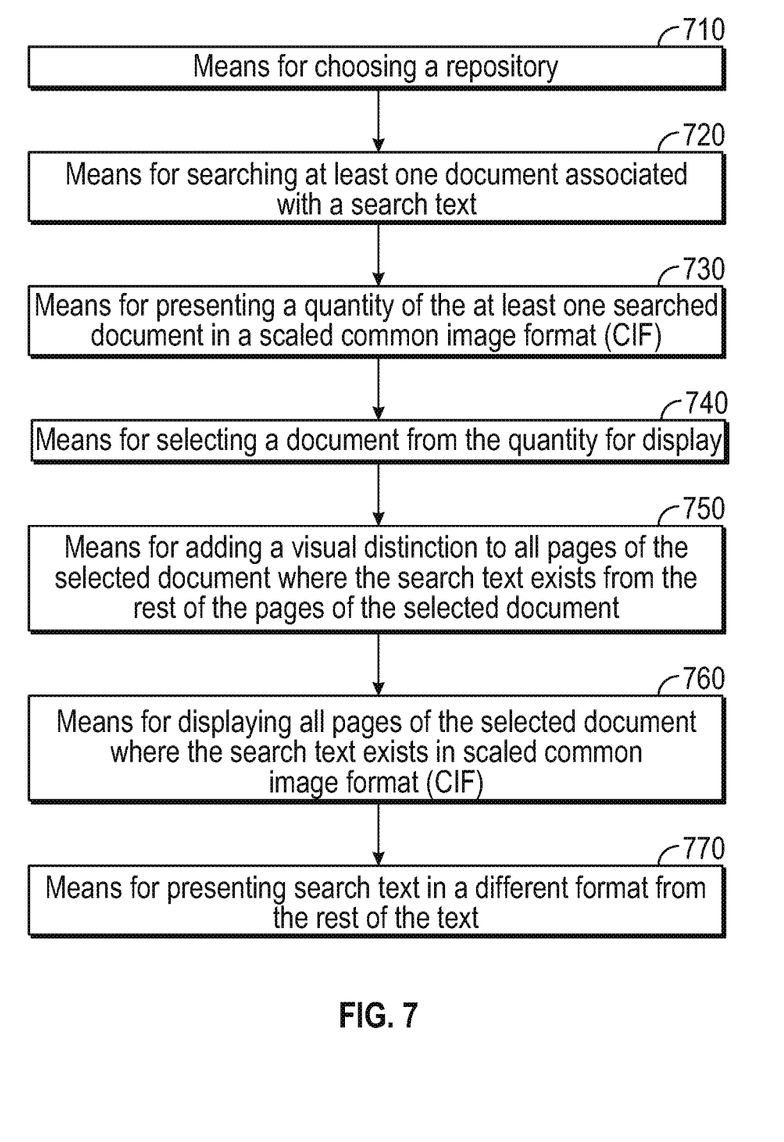
FIG. 7 illustrates an example of a second device suitable for visual presentation of search results to assist cognitive pattern recognition in the flow diagram illustrated in FIG. 2.

FIG. 7 illustrates an example of a device 700 (second device) suitable for visual presentation of search results to assist cognitive pattern recognition in the flow diagram illustrated in FIG. 2. In one aspect, the device 700 is implemented by at least one processor comprising one or more modules configured to search using cognitive pattern recognition as described herein in blocks 710, 720, 730, 740, 750, 760 and 770. For example, each module comprises hardware, firmware, software, or any combination thereof. In one aspect, the device 700 is also implemented by at least one memory in communication with the at least one processor.

Figure 8:
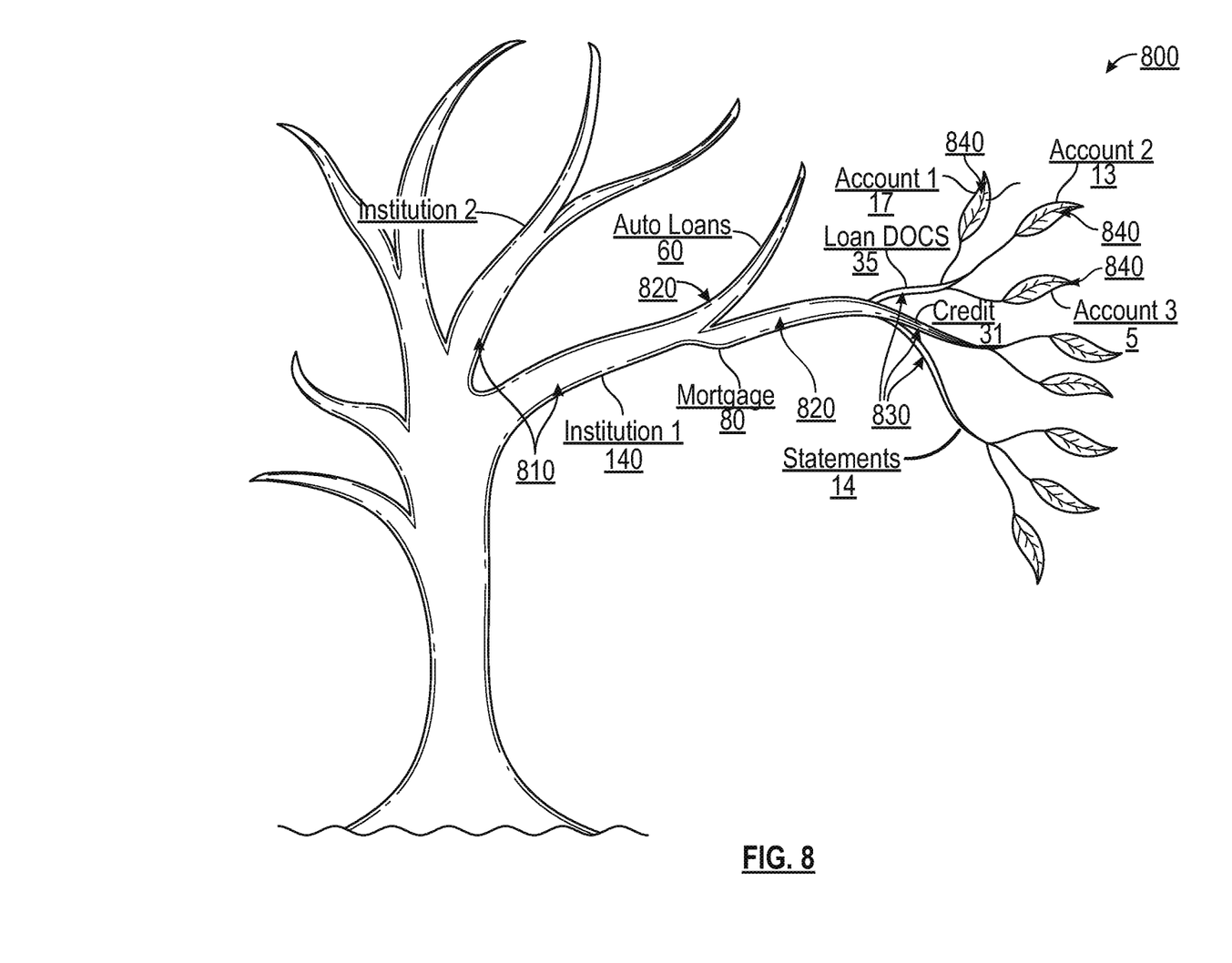
FIG. 8 illustrates an example of a tree structure view.

FIG. 8 illustrates an example of a tree structure view 800. Although the tree structure view 800 is represented as a tree in FIG. 8, other representations that show relationships between the different elements of the tree structure view are also within the scope and spirit of the present disclosure. In FIG. 8, the elements of the tree structure view 800 are illustrated as limbs 810, branches 820, twigs 830 and leaves 840.

In various aspects, the tree structure view 800 includes a plurality of limbs 810. Each limb 810 may include a plurality of branches 820. Each of the plurality of branches 820 includes a plurality of twigs 830. And, each of the plurality of twigs 830 includes a plurality of leaves 840. In various aspects, each limb 810, each branch 820, each twig 830 and each leaf 840 may be defined based on the selected repository. The limb, the branch, the twig and/or the leaves may be defined a priori to conducting a search, for example, by a pre-defined application software program, by a user either a priori to conducting a search or at the time the search is to be conducted. Although the examples shown herein is a tree structure view with four elements (limbs, branches, twigs and leaves), the tree structure view is not fixed by these four elements. For examples, a tree structure view with less than the four elements may be used and be within the scope and spirit of the present disclosure. In the alternative, the tree structure view may include additional intervening elements, for example, between the limbs and the branches, between the branches and the twigs and/or between the twigs and the leaves such that the tree structure view may include more than four elements. In various examples, the elements are related to each other, for example, one element may be a subset of another element. In the example of the four elements, the leaf element is a subset of the twig element, the twig element is a subset of the branch element, and the branch element is a subset of the limb element.

In various aspects, the different elements are defined based on the selected repository. In one example, the selected repository is a database of financial documents. In this example, a user may define the plurality of limbs 810 to be different financial institutions (e.g., different banking institutions, different investment firms, different lending agencies, different locations of the banking institutions, the investment firms, or the lending agencies, etc.). In this example, the user may define the plurality of branches 820 to be different departments within each financial institutions (e.g., mortgage loan department, car loan department, accounts department, customer service department, etc.). In this example, the user may define the plurality of twigs 830 to be different types of financial documents (e.g., banking history statements, loan documents, financial credit histories, etc.). In this example, the user may define the plurality of leaves 840 to be different account holders.

In another example, where the tree structure view is associated with the pharmaceutical field, the limbs may be different pharmaceutical product lines, the branches may be different sales locations (e.g., hospitals), the twigs may be different distributors for the pharmaceutical product lines and the leaves may be different customers (e.g., doctors who dispenses the pharmaceutical product lines). In this example, the user may also define the limbs to be the different distributors and the branches to be different sales locations. Thus, the different elements are not fixed and are defined according to the user's choice and/or the database to be searched.

In yet another example, where the tree structure view is associated with consumer vehicles, the limbs may be defined as different vehicle models, the branches may be defined as different sales locations (e.g., different countries, different states, etc.) and the twigs may be defined as different dealerships. In this example, only 3 elements are specified. Given the examples above, one skilled in the art would understand that the definitions of the different elements and the quantity of the different elements may be arbitrarily defined according to the user's choice and/or the type of database to be searched. Thus, the examples of the different elements illustrated here are only examples and not exclusive of other examples that may be used with the tree structure view.

In various aspects, each of the elements (limbs, branches, twigs, leaves) may be displayed into categories of buckets. For example, a blue bucket may indicate all the inputted keywords are found in the content of a document, a yellow bucket may indicate all the inputted keywords are found in the metadata of the document, a green bucket may indicate that only some of the inputted keywords are found in the content of the document, and an orange bucket may indicate that only some of the inputted keywords are found in the metadata of the document. In each element, the search result may be displayed within the 4 buckets to indicate whether the inputted keywords are all found within the content of the document, all found within the meta data, partially found within the content of the document and/or partially found within the meta data.

In various examples, the present disclosure includes the option of determining any overlap between the buckets. For example, assume there are 10 documents found in each of the four buckets. The user may exercise a first overlap option, for example, between the blue bucket and the yellow bucket to see which of the 10 documents categorized in the blue bucket are also found in the yellow bucket and present this as the first overlap result. The first overlap result in this example would be documents that have all the inputted keywords found in their respective contents and all the inputted keywords found in their respective meta.

In a second example, the user may exercise a second overlap option between the blue bucket and the orange bucket and present a second overlap result. In this second overlap result, the documents included would be documents with all the inputted keywords found in their respective contents but only some of the inputted keywords found in their respective meta data.

In a third example, the user may exercise a third overlap option between the yellow bucket and the green bucket and present a third overlap result. In this third overlap result, the documents included would be documents with all the inputted keywords found in their respective meta data but only some of the inputted keywords found in their respective content.

In a fourth example, the user may exercise a fourth overlap option between the green bucket and the orange bucket and present a fourth overlap result. In this fourth overlap result, the documents included would be documents with some of the inputted keywords found in their respective contents and some of the inputted keywords found in their respective meta data.

In various examples, the limbs 810, the branches 820, the twigs 830 and/or the leaves 840 may indicate the quantity of documents in the search result that are categorized respectively within each of the limbs 810, the branches 820, the twigs 830 and/or the leaves 840. That is, display a quantity of documents in the search result belonging to one of the elements. Or, display for each of the elements (the limbs 810, the branches 820, the twigs 830 and the leaves 840), a respective quantity of documents in the search result belonging to each of the elements.

In some examples, the tree structure view may display a summary view which is a display of only the quantities of documents associated with each of the limbs 810, the branches 820, the twigs 830 and/or the leaves 840. In some aspects, the display of the tree structure view includes a user interactive option which allows the user to determine how many limbs, branches, twigs and leaves to show at any one screen shot. For example, a user may choose to show all the limbs at the first screen shot. Once the first screen shot is on display, the user may choose to display the branches associated with the one or more limbs at the second screen shot. Once the second screen shot is on display, the user may choose to display one or more twigs associated with the one or more of the branches at the third screen shot. Once the third screen shot is on display, the user may choose to display one or more leaves associated with the one or more twigs at the fourth screen shot. Although the example illustrates a progression of displaying limbs, then branches, then twigs and then leaves, in the alternative, the user may also choose at any of the screen shots to display leaves, twigs, branches and/or limbs in any order.

In various aspects, a display of search results in the limb, branch, twig and/or leaf elements may be prioritized in terms of how the documents found within each element is displayed. For example, the prioritization may be based on one or more of the following criteria: date of the document, quantity of pages of the document, and/or meta data parameters of the document, etc.

In various aspects, a display of search results in the buckets may be prioritized in terms of how the documents found within each bucket is displayed. That is, perform a prioritization of how to display each document of the search results that are within each of the bucket categories and display the documents within each bucket categories according to the prioritization. For example, the prioritization may be based on one or more of the following criteria: date of the document, quantity of pages of the document, and/or a meta data parameter of the document, etc. For example, a meta data parameter may include a document format (e.g., PDF, Word, Excel, etc.,), a document type (e.g., correspondences such as e-mail or letters, internally generated documents, received documents, financial documents, legal documents, etc.), or a document version, etc.

Figure 9:
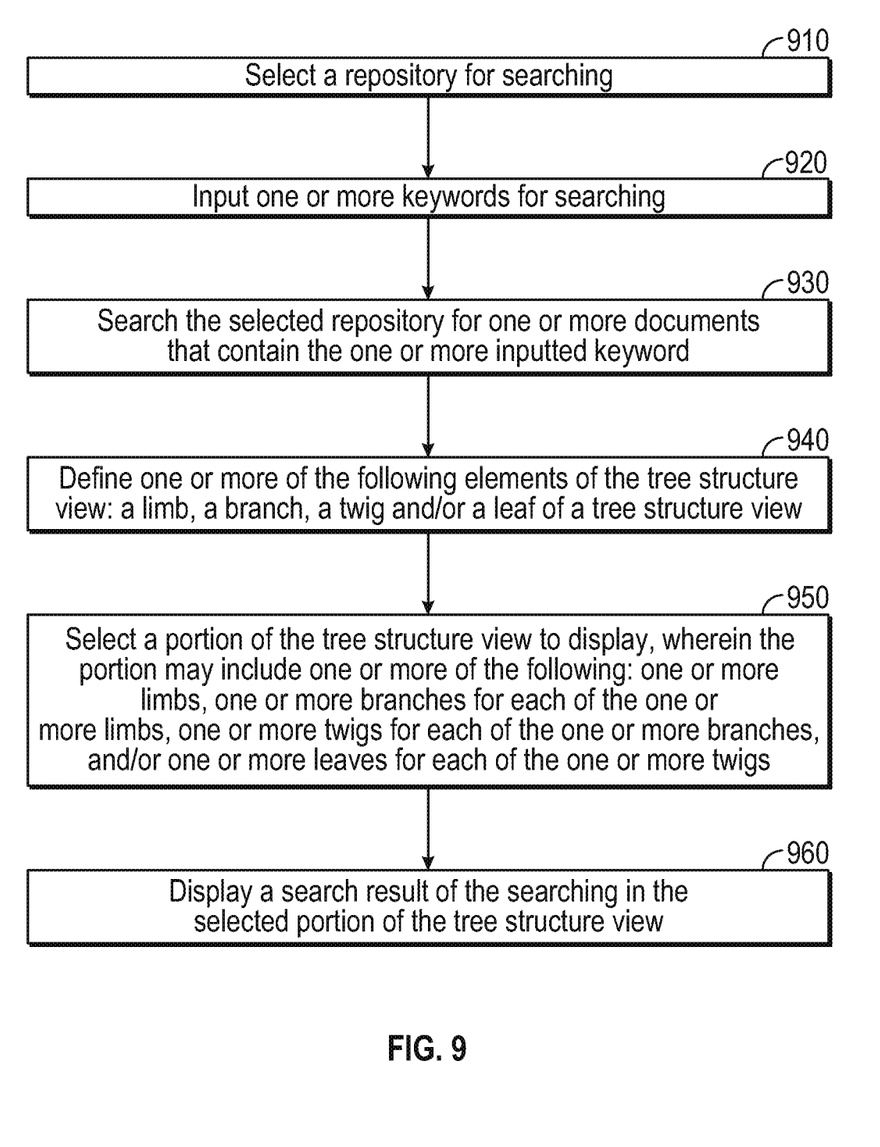
FIG. 9 illustrates an example of a third flow diagram for visual presentation of search results to assist cognitive pattern recognition.

FIG. 9 illustrates an example of a third flow diagram for visual presentation of search results to assist cognitive pattern recognition. In block 910, select a repository for searching. In block 920, input one or more keywords for searching. In various examples, a keyword may be a single word, the keyword may be a phrase of multiple words or it may be a symbol. In some examples, a keyword may be marked as a mandatory keyword. A mandatory keyword is a keyword that must be found in a document of the selected repository for searching for the document to be included in a search result of the searching. In one or more examples, a mandatory keyword is defined as keyword "Johnny Smith". In these examples, if the keyword "Johnny Smith" appears anywhere within a document, then the parameter of the mandatory keyword is met and the document would be included in the search result. The document may also be included in the search result even if the keyword "Johnny Smith" only appears in the metadata of the document. However, in other examples, a parameter may be specified to indicate that the mandatory keyword must appear in the context of the document and not just in the metadata of the document for the document to be included in the search result. In various examples, a parameter may be specified to indicate that the mandatory keyword must appear in the metadata of the document and not just in the content of the document for the document to be included in the search result.

In various examples, a mandatory keyword may also be marked as a location mandatory keyword. A location mandatory keyword is a mandatory keyword marked with a location associated with a document, and a document within the selected repository is only included in the search result of the searching if the location mandatory keyword appears in the location of that document. For example, a location mandatory keyword may include two parameters: a keyword that is mandatory and a location in the document where the keyword may appear. In one or more examples, a location mandatory keyword is defined as keyword "Johnny Smith" and as location on "the first page" of the document. In these examples, if the keyword "Johnny Smith" appears in a document but does not appear within the first page of the document, then the parameters of the location mandatory keyword are not met and the document would not be included in the search result. In various examples, a search may include one or more mandatory keywords and/or one or more location mandatory keywords.

In some examples, the location of a document may be defined as one of the following: a left top quadrant of a document page, a right top quadrant of the document page, a left bottom quadrant of the document page, or a right bottom quadrant of the document page. In some other examples, the location within a page of a document may be defined as the top, the middle or the bottom section of a document page divided into three horizontal sections (top, middle bottom). In some other examples, the location may be defined relative to a sentence, a paragraph or a specified coordinate space. For example, the location may be defined as the fifth sentence of a page of a document, the location may be defined as the first paragraph of a page of the document, or the location may be defined as near a specified coordinate space, for example, a signature block, a logo, a header space, a footer space, etc.

In various aspects, a keyword may be an excluded keyword. That is, an excluded keyword is a word, a phrase (e.g., multiple words) or a symbol which is defined as not appearing in a document for that document to be included in a search result. In some examples, a search option (a.k.a. single page search option) may be defined only for a single page of a document such that a defined single page must include the keyword, the mandatory keyword, the location mandatory keyword and/or the excluded keyword for the document to be included in a search result. The defined single page may be the first page of the document or may be the last page of the document, or some other pre-defined page of the document. In one or more examples, the each document of the search result of the single page search option includes at least one single page that contains all the keywords to be searched.

In some aspects, the order of block 910 and block 920 may be interchanged with each other. In other aspects, block 910 and block 920 may be performed simultaneously with each other. In block 930, search the selected repository for one or more documents that contain the one or more inputted keyword. In some examples, the search includes searching the context of the one or more documents. And, in some examples, the search includes searching the meta data of the one or more documents.

In block 940, define one or more of the following elements of the tree structure view: a limb, a branch, a twig and/or a leaf of a tree structure view. In block 950, select a portion of the tree structure view to display, wherein the portion may include one or more of the following: one or more limbs, one or more branches for each of the one or more limbs, one or more twigs for each of the one or more branches, and/or one or more leaves for each of the one or more twigs.

For example, the selected portion of the tree structure view may include at least one limb (i.e., limb 1), at least three branches (i.e., branch 1-1, branch 1-2, branch 1-3) with branch 1-1 including at least two twigs (i.e., twig 1-1-1, twig 1-1-2) with branch 1-2 including only 1 twig (i.e., twig 1-2-1) and with branch 1-3 including no twigs. And, for example, each of the twigs may include one or more leaves. In the example of four numbers W, X, Y, Z, the first number W identifies the limb, the second number X identifies the branch associated with that limb, the third number Y identifies the twig associated with that branch, and the fourth number Z identifies the leaf associated with that twig. Thus, a first twig that is part of a second branch of a third limb would have the following numbering scheme "twig W-X-Y" where W is 3, X is 2 and Y is 1. That is, twig 3-2-1. And, a first leaf that is part of a second twig of a third branch of a fourth limb would have the following numbering scheme "leaf W-X-Y-Z" where W is 4, X is 3, Y is 2 and Z is 1. That is, leaf 4-3-2-1.

In block 960, display a search result of the searching in the selected portion of the tree structure view. In various examples, the tree structure view may be displayed with scaled common image format (CIF) of the documents included in the search result. The page of a document to be presented as a CIF of that document (a.k.a. CIF page), for example in thumbnail or in full-page mode, may vary. In some cases, the CIF page may be defined by a user, or may be defined a priori by a software application. For example, the CIF page may be the first page of a document, the first page of a document with all the keywords, the first page of the document with all the mandatory keywords, the first page of the document with a majority of the keyword, the first page of the document with all the location mandatory keyword or with at least one location mandatory keyword, etc. In various examples, the CIF page may be multiple pages within a document that met the search condition(s).

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for displaying a search result, comprising:
selecting a repository for searching;
using a computer or a handheld device for inputting one or more keywords for searching, wherein one or more keywords include a mandatory keyword, and wherein at least one of the one or more keywords is a location mandatory keyword and the location mandatory keyword is associated with a location within a page of a document on which the location mandatory keyword will appear;
using the computer or the handheld device for inputting the location associated with the location mandatory keyword, wherein the location is one of the following: a left top quadrant of a page of a document, a right top quadrant of the page, a left bottom quadrant of the page, a right bottom quadrant of the page, a top section of the page divided into three vertical sections, a middle section of the page divided into three vertical sections, or a bottom section of the page divided into three vertical sections;
following inputting the location associated with the location mandatory keyword, using a processor for searching the selected repository for one or more documents that contain the one or more inputted keywords to generate a search result;
determining if the search result contains the one or more documents and if the search result contains the one or more documents, then defining at least two elements of a tree structure view; and
using the computer or the handheld device for selecting a portion of the tree structure view to display.

2. The method of claim 1, further comprising specifying a sentence, a paragraph or a specified coordinate space and wherein one of the one or more keywords is in a relative position to the sentence, the paragraph or the specified coordinate space.

3. The method of claim 1, further comprising searching the selected repository using a single page search option and wherein each document of the search result includes at least one single page that contains all the one or more keywords.

4. The method of claim 1, further comprising searching the context of the one or more documents.

5. The method of claim 4, further comprising searching the meta data of the one or more documents.

6. A method for displaying a search result, comprising:
selecting a repository for searching;
using a computer or a handheld device for inputting one or more keywords for searching, wherein one or more keywords include a mandatory keyword, and wherein at least one of the one or more keywords is a location mandatory keyword associated with a location within a page of a document on which the location mandatory keyword will appear;
using the computer or the handheld device for inputting the location associated with the location mandatory keyword, wherein the location is one of the following: a left top quadrant of a page of a document, a right top quadrant of the page, a left bottom quadrant of the page, a right bottom quadrant of the page, a top section of the page divided into three vertical sections, a middle section of the page divided into three vertical sections, or a bottom section of the page divided into three vertical sections;
following inputting the location associated with the location mandatory keyword, searching the selected repository for one or more documents that contain the one or more inputted keywords to generate a search result;
determining if the search result contains the one or more documents and if the search result contains the one or more documents, then defining at least two elements of a tree structure view, wherein one of the at least two elements is a subset of another of the at least two elements; and
selecting a portion of the tree structure view to display.

7. The method of claim 6, further comprising defining each of the at least two elements based on the selected repository.

8. The method of claim 7, further comprising displaying in one of the at least two elements a quantity of documents in the search result belonging to the one of the at least two elements.

9. The method of claim 7, further comprising displaying in each of the at least two elements a quantity of documents in the search result belonging to the each of the at least two elements.

10. The method of claim 6, wherein the portion of the tree structure view includes the at least two elements.

11. The method of claim 10, further comprising displaying the portion of the tree structure with at least one CIF page for each document in the search result.

12. The method of claim 11, wherein the at least one CIF page includes one of the following: a first page of a document, a first page of a document with all the one or more keywords, or a first page of the document with a majority of the one or more keywords.

13. The method of claim 6, wherein the portion of the tree structure view includes one of the at least two elements.

14. The method of claim 13, further comprising displaying the portion of the tree structure with at least one CIF page for each document in the search result.

15. The method of claim 14, wherein the at least one CIF page includes one of the following: a first page of a document, a first page of a document with all the one or more keywords, or a first page of the document with a majority of the one or more keywords.

16. A method for displaying a search result, comprising:
selecting a repository for searching;
using a computer or a handheld device for inputting one or more keywords for searching, wherein one or more keywords include a mandatory keyword, and wherein at least one of the one or more keywords is a location mandatory keyword associated with a location within a page of a document on which the location mandatory keyword will appear;
using the computer or the handheld device for inputting the location associated with the location mandatory keyword, wherein the location is one of the following: a left top quadrant of a page of a document, a right top quadrant of the page, a left bottom quadrant of the page, a right bottom quadrant of the page, a top section of the page divided into three vertical sections, a middle section of the page divided into three vertical sections, or a bottom section of the page divided into three vertical sections;
following inputting the location associated with the location mandatory keyword, using a processor for searching the selected repository for one or more documents that contain the one or more inputted keywords to generate a search result;

determining if the search result contains the one or more documents and if the search result contains the one or more documents, then defining at least two elements of a tree structure view;

using the computer or the handheld device for selecting a portion of the tree structure view to display and displaying the search result in the selected portion of the tree structure view with at least four bucket categories based on the search result, wherein the at least four bucket categories are displayed for one of the at least two elements and each of the at least four bucket categories indicates whether the one or more keywords is found in the content or metadata of the search result.

17. The method of claim 16, wherein one of the four bucket categories indicates whether or not at least one document in the search result contains all of the one or more keywords in the content of each of the at least one document in the search result.

18. The method of claim 16, wherein one of the four bucket categories indicates whether or not at least one document in the search result contains at least one of the one or more keywords in the content of each of the at least one document in the search result.

19. The method of claim 16, wherein one of the four bucket categories indicates whether or not at least one document in the search result contains all of the one or more keywords in the meta data of each of the at least one document in the search result.

20. The method of claim 16, wherein one of the four bucket categories indicates whether or not at least one document in the search result contains at least one of the one or more keywords in the meta data of each of the at least one document in the search result.

21. The method of claim 16, wherein a first of the four bucket categories indicates whether or not at least one document in the search result contains all of the one or more keywords in the content of each of the at least one document in the search result; wherein a second of the four bucket categories indicates whether or not the at least one document in the search result contains at least one of the one or more keywords in the content of each of the at least one document in the search result; wherein a third of the four bucket categories indicates whether or not the at least one document in the search result contains all of the one or more keywords in the meta data of each of the at least one document in the search result; and wherein a fourth of the four bucket categories indicates whether or not the at least one document in the search result contains at least one of the one or more keywords in the meta data of each of the at least one document in the search result.

22. The method of claim 21, further comprising determining an overlap between at least two of the at least four bucket categories.

23. The method of claim 16, further comprising determining an overlap between at least two of the at least four bucket categories.

24. The method of claim 16, further comprising prioritizing the display of each document of the search result within each of the at least four bucket categories.

25. The method of claim 24, wherein the prioritizing is based on one or more of the following: a date of the each document, a quantity of pages of the each document, or a meta data parameter of the each document, or number of keywords found in each document.

* * * * *